Patented Sept. 25, 1928.

1,685,628

UNITED STATES PATENT OFFICE.

MAX BUCHNER, OF HANOVER-KLEEFELD, GERMANY, ASSIGNOR TO ALBERT MEYER-HOFER, OF ZURICH, SWITZERLAND.

PROCESS OF MANUFACTURING COMPLEX HYDROFLUORIC SALT.

No Drawing. Original application filed July 22, 1924, Serial No. 727,545, and in Germany July 30, 1923. Divided and this application filed January 28, 1927. Serial No. 164,371.

This application is a division of my application Serial No. 727,545 filed July 22nd, 1924.

For the manufacture of hydrofluo-silicic salts there are known only very inconvenient methods, which are not easily carried out on a manufacturing scale with commercial success. Generally hydrofluoric acid and hydrofluo-silicic acid have to be made first, so that all the difficulties of the manufacture and handling of hydrofluoric acid are brought into the manufacture of hydrofluo-silicic salts.

This invention comprises a new way of making directly from its components not only hydrofluo-silicic salts, but also complex hydrofluoric compounds.

It consists in treating a fluoric salt with silicon-tetra-fluoride in presence of a decomposable salt of the base, which shall be combined with the hydrofluo-silicic acid.

With the complex salts of fluorine instead of silicon-fluoride the corresponding fluorides of other complex forming elements are used.

For assisting the formation of these compounds the reaction is carried out under pressure or under pressure and at high temperature. Volatile compounds, which result from the reactions, can be separated by distillation.

Furthermore, the process can be carried out with solid raw materials or with so little solvent that a solution of the reagents and of the compounds formed can not take plate.

The complex hydrofluoric salts are thus obtained directly from the components by this process.

Compared with known methods of making hydrofluo-silicic salts this new process has great advantages.

The manufacture of the salts is completed in one operation, whereas heretofore the initial manufacture of hydrofluoric acid by distillation was necessary, with subsequent saturation of this acid with silicic acid. The simplification of the process results in a great saving of time and of machinery.

Concerning the manufacture of hydrofluo-silicic salts, or complex hydrofluoric salts the following may be stated.

For the manufacture of hydrofluo-silicic salts according to the invention the following equation takes plate:—

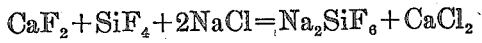

$$CaF_2 + SiF_4 + 2NaCl = Na_2SiF_6 + CaCl_2$$

Sometimes it is advantageous, to work in presence of an acid, the added acid being only a contact substance and small amounts are sufficient.

An example for the manufacture of other complex hydrofluoric salts shows the following equation:—

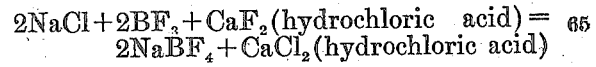

$$2NaCl + 2BF_3 + CaF_2 (\text{hydrochloric acid}) =$$
$$2NaBF_4 + CaCl_2 (\text{hydrochloric acid})$$

Hydrochloric acid being contact substance as above mentioned. The reaction is also possible without acid.

As already stated, in all cases the most convenient fluoride for the starting fluoride is fluor-spar, which can be easily and cheaply obtained. An insoluble fluoride is as a rule preferable, in so far as the fluoride is only an assisting component in the process.

That hydrochloric acid may be used in the reaction is shown by the last equation. Chlorides in the form of metal chlorides are favorable as a soluble salt component in the reaction. But any other salt can be used, which is decomposable under the conditions of the process by the other reaction components.

In the manufacture of complex fluorides another way is to let the fluoride of the complex forming element and hydrofluoric acid react upon a salt the corresponding base of which is to form part of the complex compounds. The acid of this salt is then obtained as free acid.

The following equation is a type of this reaction:—

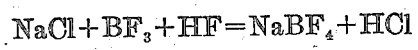

$$NaCl + BF_3 + HF = NaBF_4 + HCl$$

The advantages of this new process are in this case not so complete as may be, though acid is obtained as by-product. Therefore special ways shall be shown, where a fluoride furnishes the fluorine for the operation.

The following is an example for working:—

78 kg. fluoride of calcium are mixed with 117 kg. chloride of sodium adding to the mixture water, which has been acidified with hydrochloric acid. While stirring this mixture and heating to a temperature of about 40° C. borofluoric gas is led in. Soon the precipitation of sodium borofluoride begins. The reaction is complete, when 116 kg. borofluoride have been added. Then sodiumborofluoride is filtered and washed with water, which can easily be done.

I claim—

1. Process of manufacturing complex hydrofluoric salts, which comprises reacting on an alkali earth metal fluoride with the fluoride of an element of the group consisting of silicon and boron in the presence of a salt of the alkali metal whose complex hydrofluoric salt shall be produced.

2. Process of manufacturing complex hydrofluoric salt, which comprises reacting on an insoluble metal fluoride with the fluoride of an element of the group consisting of silicon and boron in the presence of a salt of the alkali metal whose complex hydrofluoric salt shall be produced.

3. Process of manufacturing complex hydrofluoric salt, which comprises reacting on an insoluble metal fluoride with the fluoride of an element of the group consisting of silicon and boron in the presence of the chloride of the alkali metal whose complex hydrofluoric salt shall be produced.

4. Process of manufacturing complex hydrofluoric salt, which comprises reacting on an insoluble fluoride with the fluoride of an element of the group consisting of silicon and boron in the presence of a salt of the alkali metal whose complex hydrofluoric salt shall be produced, in the presence of a small amount of acid as contact substance.

5. Process of manufacturing hydrofluosilicic salts, which comprises reacting on fluor-spar with siliconfluoride in presence of a chloride and in presence of a small amount of hydrochloric acid as contact substance.

6. Process of manufacturing complex hydrofluoric salts by the reaction of a simple fluorine compound with the fluoride of an element of the group consisting of silicon and boron and a salt of the alkali metal whose complex hydrofluoric salt shall be produced, under pressure higher than atmospheric pressure.

7. Process of manufacturing complex hydrofluoric salts by the reaction of a simple fluorine compound with the fluoride of an element of the group consisting of silicon and boron, and a salt of the alkali metal whose complex hydrofluoric salt shall be produced, under pressure higher than atmospheric pressure and at a temperature higher than atmospheric temperature.

8. Process of manufacturing complex hydrofluoric salts by reacting on a simple fluorine compound with the fluoride of an element of the group consisting of silicon and boron, and a salt of the alkali metal whose complex hydrofluoric salt shall be produced, working in presence of an amount of solvent insufficient for the solution of the reaction components.

In testimony whereof I affix my signature.

Dr. MAX BUCHNER